C. T. FULLER.
TREATING METAL FILAMENTS.
APPLICATION FILED AUG. 24, 1907.
929,578.
Patented July 27, 1909.
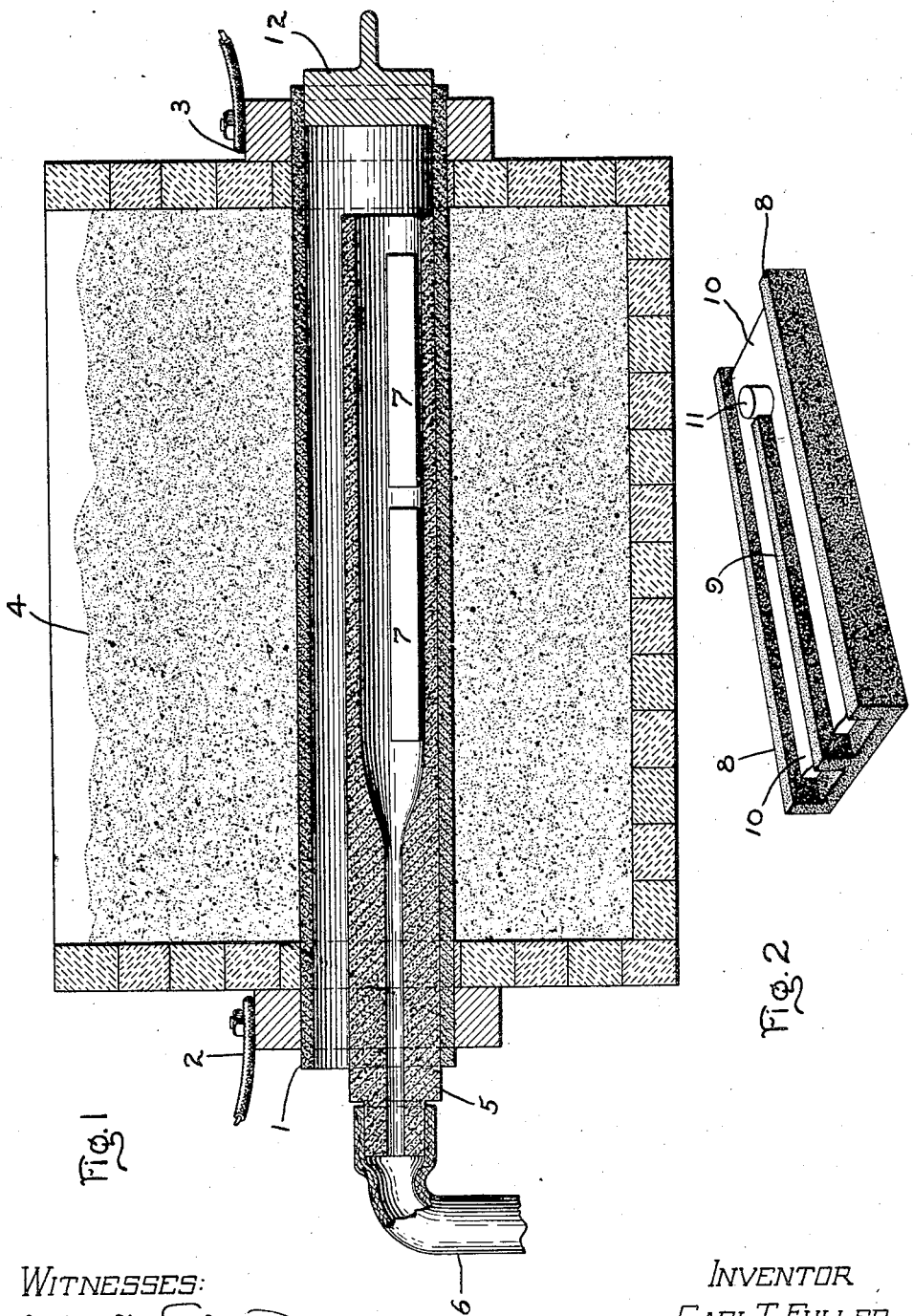
WITNESSES:
Lester H. Fulmer
Marcus L. Byng.
INVENTOR
CARL T. FULLER,
BY Allen H. Davis
ATT'Y.

UNITED STATES PATENT OFFICE.

CARL T. FULLER, OF SCHENECTADY, NEW YORK, ASSIGNOR TO GENERAL ELECTRIC COMPANY, A CORPORATION OF NEW YORK.

TREATING METAL FILAMENTS.

No. 929,578.   Specification of Letters Patent.   Patented July 27, 1909.

Application filed August 24, 1907. Serial No. 390,048.

*To all whom it may concern:*

Be it known that I, CARL T. FULLER, a citizen of the United States, residing at Schenectady, county of Schenectady, State of New York, have invented certain new and useful Improvements in Treating Metal Filaments, of which the following is a specification.

My present invention relates to the production of refractory electrical conductors suitable for use in incandescent lamps, electric furnaces, and other apparatus.

My invention comprises a process whereby a reducible compound of a refractory metal is mixed with a binder and shaped into wires or other forms, and then fired in a reducing atmosphere to effect reduction of the oxid and complete shrinkage and sintering of the refractory residue, thereby producing conductors which are strong and homogeneous and are permanent in electrical conductivity.

My process is applicable to the production of conductors of various refractory metals and materials, such for instance as tungsten, molybdenum, boron, zirconium, tantalum, titanium, graphite, or compounds or alloys of any of these, or of other materials of the same general refractory nature.

In order that my invention may be easily applied, I have hereinafter described the process as applied to the production of tungsten conductors, but this specific embodiment is to be regarded as only typical and as showing but one of numerous applications.

As the reducible compound of tungsten with which the process is begun, I prefer to use the yellow or trioxid of tungsten. This material should be in a very finely divided condition and should be pure. As a binding material for this yellow oxid, I prefer to use a starch paste compounded from 100 c. c. water and 25 grams cornstarch cooked until the water is driven off sufficiently to leave a sticky paste containing 23% starch, by weight.

In mixing the starch paste with the yellow oxid, I start with 25 grams paste and add as much oxid as the paste will take up, yielding a sticky and workable mass. The exact quantity of oxid taken up depends on the fineness of the oxid but should ordinarily amount to about 100 grams. The material so produced is soft and dough-like and can be readily squirted through a die to produce threads, bars, plates, and similar shapes. The next step in my process consists in the reduction in a furnace of the tungsten trioxid by means of hydrogen or other gaseous reducing agent. A furnace suitable for this operation is shown in the accompanying drawing, in which—

Figure 1 is a sectional elevation of the furnace, partly diagrammatic, and Fig. 2 is a perspective view of the shuttle or boat in which the filaments or threads are inclosed during the treatment.

The furnace illustrated in Fig. 1 comprises a graphite heater tube 1 supplied with current through suitable terminals 2 and 3, and inclosed in a protective coating 4 of coke or other refractory material. Within this tube, a second tube 5 may be inserted and withdrawn. This second tube is continuously supplied with hydrogen through a rubber tube 6 and serves as a receptacle for the boats or shuttles 7 containing the material to be treated. I prefer that tube 5 should have a small bore at the end connecting with the rubber tube 6 and should have an enlargement at the end containing the boat 7. The refractory boat consists of a trough-shaped member having side walls 8 and a central web 9 and having a lining of refractory material 10 consisting of rutile or of other materials hereinafter mentioned. A post 11 of rutile is mounted at one end of the boat to serve as an anchoring device for the filaments under treatment. To effect reduction of the squirted threads of $WO_3$ I withdraw the tube 5 from the furnace, arrange the threads in bundles on the rutile packing 10 of boats 7, introduce these boats into the tube and return the tube 5 to its position within the heated tube 1, maintaining during this time a stream of hydrogen through the tube 5. As the tungsten trioxid heats up in the furnace it is attacked by the carbon of the binding means and is in part reduced thereby. It is further reduced by the current of hydrogen circulating through the tube. Complete reduction may require only a few minutes and yields pure tungsten threads or wires relatively fragile, and unshrunk, and therefore unsuited for use in lamps without subsequent treatment to give them permanence. The next step, or what may possibly be considered as a continuation of the previous step, consists in continuing the heat treatment, that is, firing to such a high temperature and for such a length of time as will completely sinter and shrink the tungsten wires and render them suitable for mounting in lamps without any subsequent treatment whatever. These baking and firing operations require not more than about eight minutes at a temperature of about 1475 to 1550 degrees C.

Now I have found that something more than rough heat treatment to the temperatures above mentioned, is necessary to yield a product having sufficient stability or electrical permanence to permit commercial use in lamps without subsequent individual treatment. In order that my experience may be made available to persons skilled in the art I will hereinafter mention the particular difficulties encountered and explain how those difficulties can be successfully overcome.

Some of the furnace runs made by me yielded filaments incompletely shrunk and therefore unsuited for use in lamps without individual treatment with current. In other cases, the filaments came out warped and full of kinks, and therefore unsuited for use until individually straightened. In still other cases, the filaments, while at first appearing of good quality, subsequently proved defective by reason of the presence of carbon. I have found how to overcome all these difficulties and I will hereinafter specify the precautions which I consider advisable. First of all, the filaments or threads should be completely reduced; that is, should contain no residue of unreduced oxid of tungsten. By using the starch binder above described and plenty of hydrogen in the inner tube 5, no serious difficulty will be encountered along this line. I find, however, that the hydrogen supplied to tube 5 may be advantageously returned on the outside of that tube and burned at the end of the heater tube 5. This result is easily effected by closing the heater tube with a plug 12. The next factor which in my opinion influences the shrinkage is the presence or absence of carbon during the firing or high heat treatment. By this I do not mean carbon from the binder, as that all comes out at an early stage in the treatment, but I do mean carbon from the heating members of the furnace. This can be guarded against by the use of proper material for the boat or shuttle illustrated in Fig. 2 of the drawing. In general, I prefer that the boat shall consist of or comprise a material having a high affinity for carbon, or at least having as great a tendency to absorb carbon as do the filaments under treatment. Such a body acts as an absorbing shield to take up any carbon vapor given off by the furnace tube.

Of the various materials used by me in constructing the boats, I have obtained best results with a carbon boat having a packing of rutile $TiO_2$ the materials being arranged as shown in Fig. 2 of the drawing. I have also successfully used carbon boats lined with powdered tungsten. Either rutile or powdered tungsten serves, by virtue of its high affinity for carbon, to protect the filaments from whatever carbon vapor may be circulating through the tube. These materials also possess the very important requisite of not sticking to the filaments or combining therewith, in this respect being similar to powdered silica which I have successfully used, and being, in my opinion, far superior to oxids of the earth metals, such as thorium, magnesium, cerium, etc. By the use of materials which do not become sticky, the filaments are free to move longitudinally in the boats and are free to undergo complete shrinkage. When treated as above described, they do undergo this shrinkage, and they attain an electrical resistance which remains substantially constant throughout their normal life as filaments in lamps. This resistance is directly comparable with the resistance of filaments shrunk or sintered individually with current in a treating bottle.

My furnace method of firing and shrinking has great commercial advantage in that it permits simultaneous treatment of dozens or even hundreds of filaments, and furthermore yields conductors, which, for any furnace run, are sure to be uniform in size, composition, and electrical properties, and therefore adapted for use in series without previous sorting and weighing or other calibration.

What I claim as new and desire to secure by Letters Patent of the United States, is,—

1. The method which consists in shaping a reducible compound of a refractory metal into a thread, heating said thread in a furnace in the presence of a gaseous reducing agent to effect complete reduction of the compound, and firing the reduction product so obtained, under cover of said gaseous reducing agent, until said product is sintered to a condition of stable conductivity.

2. The method which consists in mixing a reducible compound of a refractory metal with a carbonaceous binding material, shaping said mixture into threads, simultaneously baking a plurality of said threads in a furnace containing hydrogen, to cause reduction of said compound, and firing the reduction product so obtained until it is sintered into a conductor of permanent conductivity.

3. The method of finishing tungsten filaments consisting essentially of material obtained by reduction of tungsten trioxid with hydrogen, which consists in firing a plurality of said filaments in a furnace under protection of hydrogen and a carbon absorbing means.

4. The method which consists in mixing tungsten trioxid with a binding material, shaping threads from the mixture so formed, simultaneously baking a plurality of said threads in hydrogen to effect complete reduction of the trioxid, and subsequently firing said filaments to about 1500 degrees C. in a reducing atmosphere free from carbon.

5. The method which consists in mixing an oxid of tungsten with a carbonaceous binding material, shaping threads from the mixture so formed, simultaneously baking a plurality of said threads in a reducing atmosphere to effect complete reduction of the oxid, and subsequently firing said filaments under protection of a carbon absorbing means, continuing the heating until the tungsten is sintered to a condition of stable conductivity.

6. The method of finishing tungsten filaments, which consists in firing a plurality of said filaments in an open tube, and simultaneously protecting said filaments with hydrogen and rutile.

7. The method of finishing tungsten filaments produced by reduction of an oxid of tungsten with carbon and hydrogen, which consists in firing a plurality of said filaments in a furnace under protection of a carbon absorbing means, said firing being continued until the product is sintered to a condition of stable conductivity.

In witness whereof, I have hereunto set my hand this 23rd day of August, 1907.

CARL T. FULLER.

Witnesses:
HELEN ORFORD,
ARBA B. MARVIN, Jr.